US012707373B2

(12) United States Patent
Baek et al.

(10) Patent No.: US 12,707,373 B2
(45) Date of Patent: Aug. 11, 2026

(54) METHOD AND DEVICE FOR SUPPORTING UE MOBILITY BETWEEN NETWORKS

(71) Applicant: Samsung Electronics Co., Ltd., Suwon-si (KR)

(72) Inventors: Youngkyo Baek, Suwon-si (KR); Kisuk Kweon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 317 days.

(21) Appl. No.: 18/559,547

(22) PCT Filed: May 6, 2022

(86) PCT No.: PCT/KR2022/006469

§ 371 (c)(1),
(2) Date: Nov. 7, 2023

(87) PCT Pub. No.: WO2022/235100

PCT Pub. Date: Nov. 10, 2022

(65) Prior Publication Data

US 2024/0244508 A1 Jul. 18, 2024

(30) Foreign Application Priority Data

May 7, 2021 (KR) ........................ 10-2021-0059524

(51) Int. Cl.
*H04W 48/08* (2009.01)
*H04W 36/14* (2009.01)
*H04W 60/00* (2009.01)

(52) U.S. Cl.
CPC ........... *H04W 48/08* (2013.01); *H04W 36/14* (2013.01); *H04W 60/00* (2013.01)

(58) Field of Classification Search
CPC ..... H04W 48/08; H04W 36/14; H04W 60/00; H04W 8/06; H04W 8/26; H04W 76/34;
(Continued)

(56) References Cited

U.S. PATENT DOCUMENTS

2020/0314701 A1* 10/2020 Talebi Fard .......... H04W 36/08
2021/0099968 A1 4/2021 Tiwari et al.
(Continued)

FOREIGN PATENT DOCUMENTS

EP 3840436 A1 6/2021
KR 10-2021-0038352 A 4/2021
(Continued)

OTHER PUBLICATIONS

Supplementary European Search Report dated Jul. 26, 2024, in connection with European Application No. 22799143.7, 17 pages.
(Continued)

*Primary Examiner* — Khoa Huynh

(57) ABSTRACT

The present disclosure relates to a 5G or 6G communication system for supporting a higher data transmission rate. A method of an AMF entity of the present disclosure comprises the steps of: receiving a registration request message for network registration from a UE moved from a first network that is an SNPN to a second network, wherein the registration request message includes temporary ID information of the UE and network ID (NID) information of the first network to which the temporary ID information is allocated; identifying a first AMF entity belonging to the first network on the basis of the temporary ID information and the NID information; transmitting, to the first AMF
(Continued)

entity, a request message for requesting context information of the UE; and receiving a response message including the context information from the first AMF entity.

16 Claims, 10 Drawing Sheets

(58) Field of Classification Search
CPC . H04W 48/18; H04W 60/04; H04W 36/0033; H04W 36/385; H04W 84/042; H04W 84/10
See application file for complete search history.

(56) References Cited

U.S. PATENT DOCUMENTS

| | | | | |
|---|---|---|---|---|
| 2021/0112483 | A1 | 4/2021 | Ke | |
| 2022/0232506 | A1* | 7/2022 | Lai | H04W 60/04 |
| 2023/0021988 | A1 | 1/2023 | Park et al. | |

FOREIGN PATENT DOCUMENTS

| | | | |
|---|---|---|---|
| KR | 10-2021-0088306 | A | 7/2021 |
| WO | 2020048512 | A1 | 3/2020 |
| WO | 2020160178 | A1 | 8/2020 |

OTHER PUBLICATIONS

Samsung, et al., "UE context retrieval during registration procedure considering SNPN involved," S2-2105019 (was S2-2104163r10), 3GPP TSG-SA WG2 Meeting #145E, E-Meeting, May 17-28, 2021, 19 pages.
International Search Report and Written Opinion of the International Searching Authority dated Aug. 5, 2022, in connection with International Application No. PCT/KR2022/006469, 11 pages.
3GPP TR 23.700-07 V17.0.0 (Mar. 2021), Technical Report, 3rd Generation Partnership Project; Technical Specification Group Services and System Aspects; Study on enhanced support of Non-Public Networks (NPN) (Release 17), Mar. 2021, 248 pages.
3GPP TS 23.502 V17.0.0 (Mar. 2021), Technical Specification, 3rd Generation Partnership Project; Technical Specification Group Services and System Aspects; Procedures for the 5G System (5GS); Stage 2 (Release 17), Mar. 2021, 646 pages.
OPPO, "Onboarding indication over RRC and NAS," S2-2100690, 3GPP TSG-SA WG2 Meeting #143-e, Electronic meeting, Feb. 24-Mar. 9, 2021, 19 pages.
Qualcomm Incorporated, et al., "SNPN selection for access to SNPNs using credentials from an entity separate from the SNPN," C1-212072 (was C1-210741), 3GPP TSG-CT WG1 Meeting #129-e, Electronic meeting, Apr. 19-23, 2021, 14 pages.

* cited by examiner

METHOD AND DEVICE FOR SUPPORTING UE MOBILITY BETWEEN NETWORKS

CROSS-REFERENCE TO RELATED APPLICATIONS

This application is a U.S. National Phase Entry of PCT international Application No. PCT/KR2022/006469, which was filed on May 6, 2022, and claims priority to Korean Patent Application No. 10-2021-0059524 filed on May 7, 2021, in the Korean Intellectual Property Office, the contents of which are incorporated herein by reference.

TECHNICAL FIELD

The disclosure relates to a method and device for supporting UE mobility between networks. More specifically, the disclosure relates to a method and device for supporting UE mobility between a standalone non-public network (SNPN) and another cellular network (e.g., a normal public cellular network or another standalone non-public network).

BACKGROUND ART 5G mobile communication technologies define broad frequency bands such that high transmission rates and new services are possible, and can be implemented not only in “Sub 6 GHZ” bands such as 3.5 GHZ, but also in “Above 6 GHz” bands referred to as mmWave including GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources. For a standalone non-public network locally operated, such as providing a communication service in a smart factory, operating a standalone non-public network (SNPN) locally configured is considered separately from the general public cellular network. In this case, a procedure for fetching the UE’s context information stored in the existing serving network is performed to minimize the UE’s network access process when the UE moves between the normal public cellular network and the standalone non-public network (SNPN) or when the UE accesses another standalone non-public network (SNPN), i.e., the target network, to which the UE has moved.

Required in this case is a method for addressing the UE's access delay due to processing of unnecessary information.

DETAILED DESCRIPTION OF THE INVENTION

Technical Problem

For example, for a private communication network operated locally, such as providing a communication service in a smart factory, it is considered to operate a standalone non-public network (SNPN) configured locally separately from a general public cellular network. In this case, in order to minimize the network access process of the UE when the UE moves between a general public land mobile network (PLMN) and a standalone non-public network (SNPN) or when the UE moves to another standalone non-public network (SNPN) according to the movement of the UE, the UE performs a procedure of bringing the context information of the UE stored in the existing serving network to the target network.

For example, when the UE requests network access in the target network, the UE may transfer the temporary ID of the UE allocated from the existing serving network so that the new access and mobility management function (AMF) of the target network may store the UE context from the old AMF based on the UE's temporary ID transferred. In this case, the UE context may include information for mobility management (MM) of the UE, subscription permanent identifier (SUPI) information of the UE, and/or security-related information. Further, the UE context may further include information (PDU session level context) for session management (SM) where the UE is receiving a service, e.g., a protocol data unit (PDU) session ID, and an ID or address information of the session management function (SMF) managing the PDU session. Further, the UE context may further include at least one of association information (e.g., information for AM policy association, information for UE policy association, and/or information for UE NWDAF association) with another network function (NF) or event subscription information. In an embodiment, the UE context may include, e.g., all or some of the items (parameters) included in Table 5.2.2.2.2-1 (UE context in AMF) of IEEE TS 23.502.

However, since roaming is not supported between the SNPN network and the PLMN network or the SNPN network, even if the SM context of the UE is brought from the old AMF, activation for the corresponding PDU session inevitably fails, resulting in only a delay in the network resource and network access process. Disclosed is a method for reducing inefficiency due to failure in an activation attempt according to the SM context of the UE.

Also disclosed is a method for the RAN to route the initial non-access stratum (NAS) message sent by the UE to an appropriate AMF when the UE moving between SNPNs in the idle state sends an initial NAS message, such as a registration request message, to the AMF.

Technical Solution

A method by a first AMF entity according to an aspect of the disclosure may comprise receiving, from a UE, a registration request message for a first network of the first AMF entity through a base station, the registration request message including the UE's temporary ID information allocated by a second AMF, transmitting a context request message for requesting context information about the UE based on the registration request message to the second AMF entity, and receiving a response message corresponding to the context request message from the second AMF entity. At least one of a first network of the first AMF entity or a second network of the second AMF entity may correspond to an SNPN. The response message may include at least part of context information stored in the second AMF entity. The context information may include at least one of information for mobility management of the UE, authentication-related context information, information for session management for a service provided to the UE, or information related to an event subscription for the UE.

A method by a second AMF entity according to another aspect of the disclosure may comprise receiving, from a first AMF entity, a context request message for requesting context information for a UE transmitting a registration request message to the first AMF entity and transmitting a response message corresponding to the context request message to the first AMF entity. At least one of a first network of the first AMF entity or a second network of the second AMF entity may correspond to an SNPN. The response message may include at least part of context information stored in the second AMF entity. The context information may include at least one of information for mobility management of the UE, authentication-related context information, information for session management for a service provided to the UE, or information related to an event subscription for the UE.

A method by an access and mobility management function (AMF) entity according to another aspect of the disclosure may comprise receiving a registration request message for network registration from a user equipment (UE) moving from a first network which is a standalone non-public network (SNPN) to a second network, the registration request message including the UE's temporary identifier (ID) information and a network ID (NID) of the first network allocating the temporary ID information, identifying a first AMF entity belonging to the first network based on the temporary ID information and the NID information, transmitting a request message for requesting the UE's context information to the first AMF entity, and receiving a response message including the context information from the first AMF entity.

As an embodiment, the method may further comprise transmitting, to the first AMF entity, a registration state update message including a list of a protocol data unit (PDU) session ID to be released when mobility of the UE from the first network to the second network is mobility between SNPNs.

As an embodiment, the list of the PDU session ID may be obtained from the context information.

As an embodiment, the method may further comprise deleting session management (SM) context information associated with the list of the PDU session ID from the context information.

As an embodiment, the first AMF entity may request a first session management function (SMF) belonging to the first network to release session management (SM) context information associated with the list of the PDU session ID.

As an embodiment, the temporary ID information may be a 5G-globally unique temporary identifier (GUTI).

As an embodiment, the first AMF entity may be selected by a base station receiving the registration request message.

As an embodiment, the method may further comprise transmitting, to the UE, a registration authorization message including the UE's temporary ID information newly allocated by the second network.

An access and mobility management function (AMF) entity according to another aspect of the disclosure may comprise a transceiver and a controller. The controller may be configured to receive a registration request message for network registration from a user equipment (UE) moving from a first network which is a standalone non-public network (SNPN) to a second network, the registration request message including the UE's temporary identifier (ID) information and a network ID (NID) of the first network allocating the temporary ID information, identify a first AMF entity belonging to the first network based on the temporary ID information and the NID information, transmit a request message for requesting the UE's context information to the first AMF entity, and receive a response message including the context information from the first AMF entity.

As an embodiment, the controller may be further configured to transmit, to the first AMF entity, a registration state update message including a list of a protocol data unit (PDU) session ID to be released when mobility of the UE from the first network to the second network is mobility between SNPNs.

As an embodiment, the list of the PDU session ID may be obtained from the context information.

As an embodiment, the controller may be further configured to delete session management (SM) context information associated with the list of the PDU session ID from the context information.

As an embodiment, the first AMF entity may request a first session management function (SMF) belonging to the first network to release session management (SM) context information associated with the list of the PDU session ID.

As an embodiment, the temporary ID information may be a 5G-globally unique temporary identifier (GUTI).

As an embodiment, the first AMF entity may be selected by a base station receiving the registration request message.

Advantageous Effects

Based on the temporary ID of the UE received through the registration request message, the newly selected new AMF requests a context for the UE from the old AMF having allocated the temporary ID, and the old AMF transfers information about the UE, i.e., the UE context, to the new AMF. Accordingly, according to an embodiment of the disclosure, when the registration request message sent by the UE is successfully authenticated, a separate authentication process for the UE need not be performed.

Further, according to the operation of the old AMF, the new AMF obtains the PDU session where the UE receives a service from the context for the session included in the UE context and information about the SMF managing the PDU session and attempts to reactivate the PDU session. However, when the networks serviced by the new AMF and the old AMF are different networks and one of the two networks is an SNPN, roaming is not supported between the two networks, and thus the process of reactivating the PDU session inevitably fails. Thus, network resource waste and network access delay occur due to unnecessary attempt to allocate resources for the access network and failure. However, according to an embodiment of the disclosure, it is possible to prevent unnecessary resource waste and network access delay by restricting PDU session activation attempts that inevitably fail by adjusting, in advance, processing of the UE SM context that inevitably fails.

Further, according to an embodiment of the disclosure, it is possible to prevent an unnecessary procedure for obtaining a UE context between AMFs by routing the initial NAS message sent by the UE to an appropriate AMF by the RAN when the UE moving between SNPNs in the idle state sends the initial NAS message, such as a registration request message, to the AMF.

MODE FOR CARRYING OUT THE INVENTION

Figure 1:
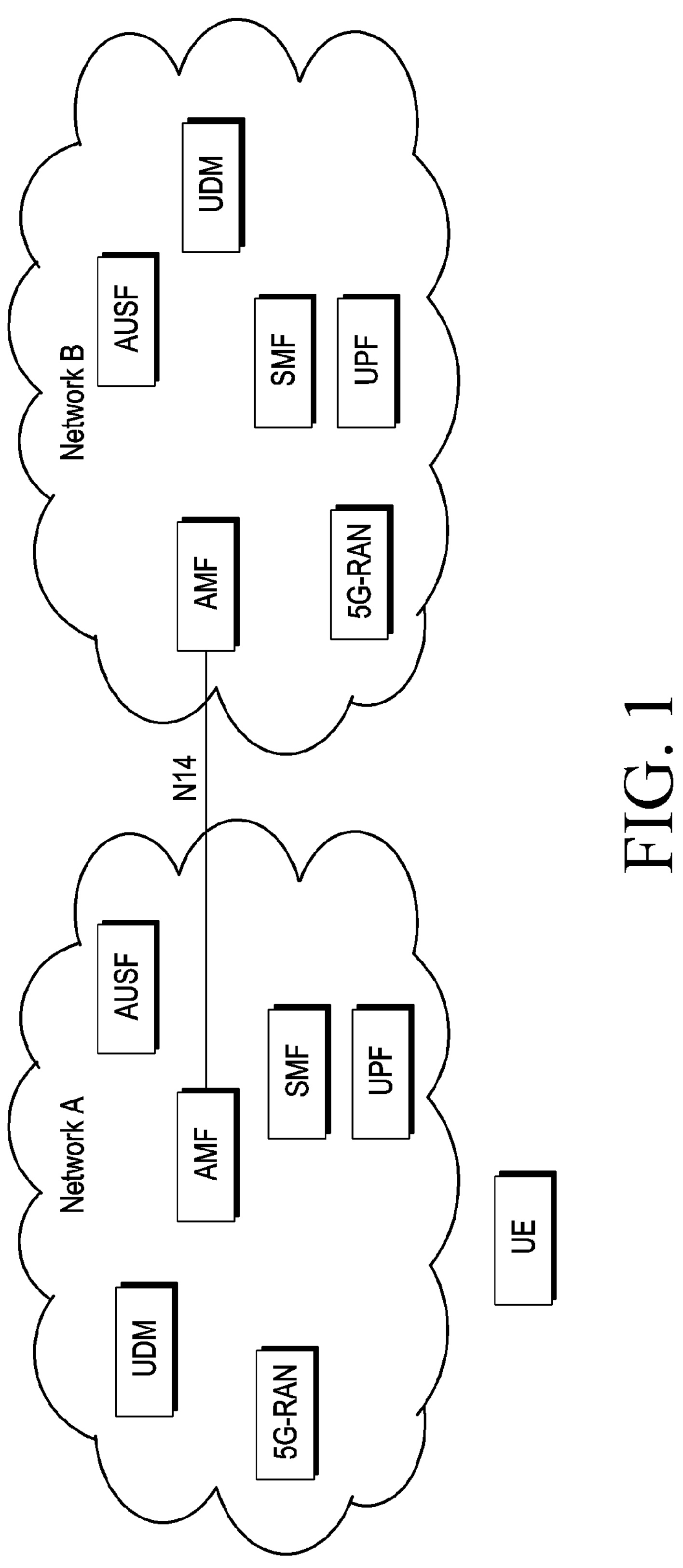
FIG. 1 is a view illustrating a structure of a communication network having an interface between AMFs of communication networks for interworking between communication networks including an SNPN according to an embodiment of the disclosure.

Hereinafter, the operational principle of the disclosure is described below with reference to the accompanying drawings. When determined to make the subject matter of the present invention unclear, the detailed description of known functions or configurations may be skipped. The terms as used herein are defined considering the functions in the present disclosure and may be replaced with other terms according to the intention or practice of the user or operator. Therefore, the terms should be defined based on the overall disclosure.

Advantages and features of the disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments of the disclosure, a " . . . unit" may include one or more processors.

Hereinafter, the operational principle of the disclosure is described below with reference to the accompanying drawings. When determined to make the subject matter of the present invention unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure. Hereinafter, the base station may be an entity allocating resource to terminal and may be at least one of gNode B, eNode B, Node B, base station (BS), wireless access unit, base station controller, or node over network. The terminal may include UE (user equipment), MS (mobile station), cellular phone, smartphone, computer, or multimedia system capable of performing communication functions. Of course, it is not limited to the above examples. Described below is technology for receiving broadcast information from a base station by a UE in a wireless communication system. The disclosure relates to communication techniques for merging 5th generation (5G) communication systems with Internet-of-things (IOT) technology to support a high data transmission rate in post-4th generation (4G) system and systems therefor. The present disclosure can be applied for intelligent services based on 5G communication technology and IoT related technology (for example, smart homes, smart buildings, smart cities, smart cars or connected cars, healthcare, digital education, retail businesses, security and safety related services, and the like).

Hereinafter, terms denoting broadcast information, terms denoting control information, communication coverage-related terms, terms (e.g., event) denoting state variations, terms denoting network entities, terms denoting messages, or terms denoting device components are provided solely for illustration purposes. The present invention is not limited to the terms, and other terms equivalent in technical concept may also be used.

FIG. 1 is a view illustrating a structure of a communication network having an interface between AMFs of communication networks for interworking between communication networks including an SNPN according to an embodiment of the disclosure.

Referring to FIG. 1, when there are two communication networks (e.g., network A and network B), one or more of the two communication networks are SNPNs. The AMFs responsible for registration management and mobility management of each network are shared with each other or connected to each other through the N14 interface between the respective AMFs of the networks. Accordingly, the UE context related to mobility and registration for the UE registered in one communication network may be shared according to a request from an AMF of another communication network connected through, e.g., the N14 interface. As such, the two communication networks may interwork with each other.

Figure 2:
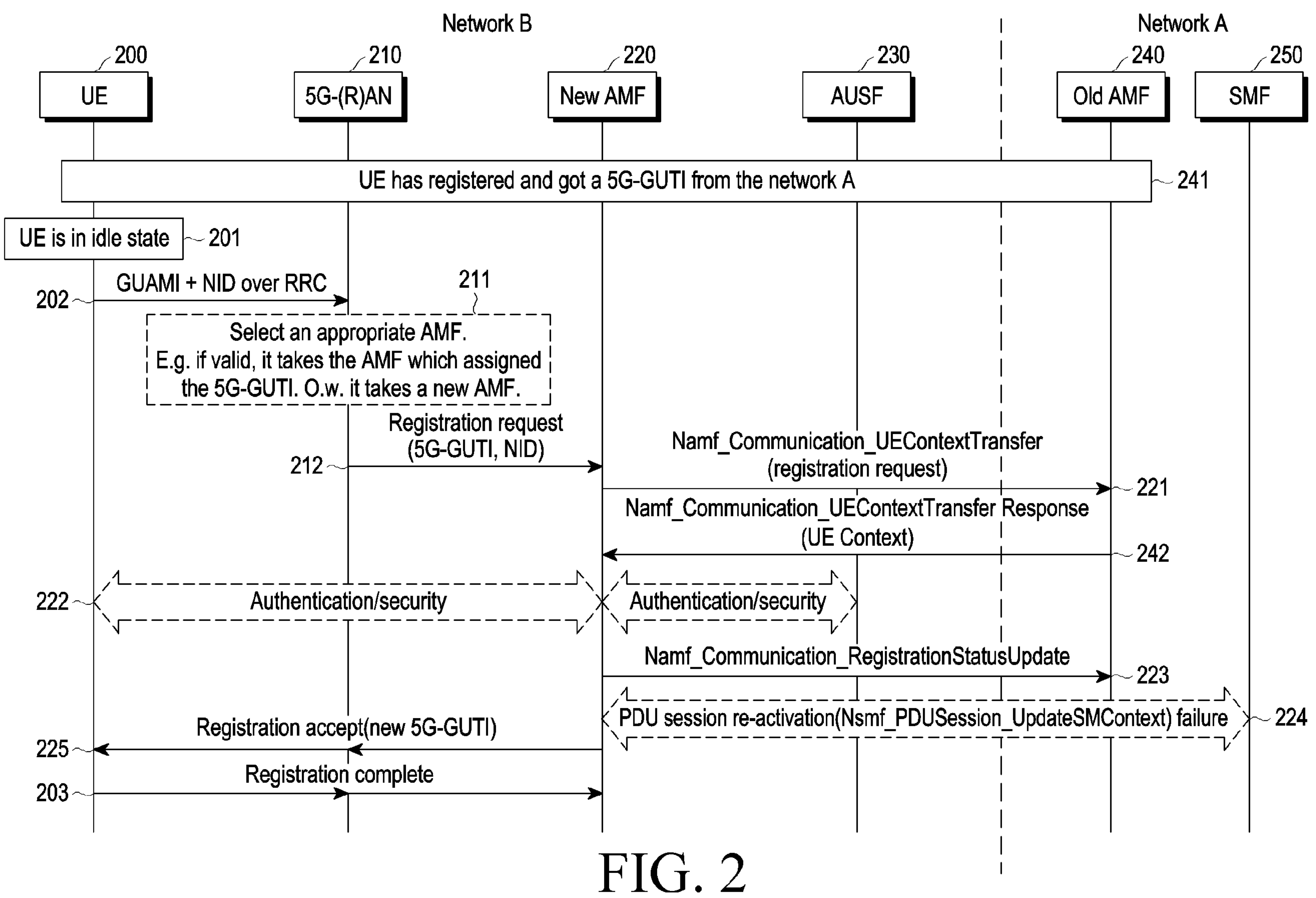
FIG. 2 is a view illustrating a process for routing an initial NAS message to an appropriate AMF based on a temporary ID of a UE allocated by an SNPN according to an embodiment of the disclosure.

FIG. 2 is a view illustrating a process for routing an initial NAS message to an appropriate AMF based on a temporary ID of a UE allocated by an SNPN according to an embodiment of the disclosure.

Referring to FIG. 2, when a UE registers in network A which is an SNPN, the UE may be allocated a temporary ID (e.g., 5G-globally unique temporary identity (GUTI)) from the old AMF 240 (operation 241). Thereafter, when the UE moves to network B, the UE may recognize that the movement from network A to network B is a movement between different SNPNs or a movement between SNPN and PLMN based on network information (e.g., a PLMN ID or a network id (NID)) broadcast by a RAN (e.g., 5G-(R)AN). In this case, the UE may recognize that handover is not supported and operate as in the idle state (operation 201). In other words, the UE may be in the idle state.

Meanwhile, in the idle state, the UE may transfer a registration request message to the RAN 210 through an RRC message in network B which is the moved network (operation 202). In this case, for the RAN 210 to find an appropriate AMF and route a registration request message, the UE may include the NID of network A, which is the SNPN having allocated the 5G-GUTI to the UE, along with the globally unique AMF ID (GUAMI) information (or 5G-GUTI), in the AN parameter sent together the registration request message to the RAN 210 and transfer the same through the RRC message. Here, the identification information (e.g., GUAMI (or GUAMI obtained from 5G-GUTI) and NID) included in the AN parameter may be used by the base station to find an appropriate AMF. The identification information (e.g., 5G-GUTI and/or NID) included in the registration request message may be used to identify the UE as well as the AMF. The AMF and, in an embodiment, the NID of network A may be used to identify network A which is an SNPN. This may be distinguished from the PLMN ID for identifying the PLMN. When the RAN receiving the GUAMI (or 5G-GUTI) and the NID is able to route to the AMF corresponding to the GUAMI (or GUAMI obtained from 5G-GUTI) and NID (valid), the RAN may transfer the received registration request message to the old AMF 240 indicated by the GUAMI and NID (i.e., the old AMF 240 identified by the GUAMI and NID), enabling the registration process to be performed.

For reference, when the NID is not transmitted to the RAN together with the GUAMI (or 5G-GUTI), and when there is an AMF of another network using the same GUAMI as the old AMF, the registration request message may be transferred to a wrong AMF. Therefore, in a case where the UE is allocated the 5G-GUTI from the SNPN, when transferring the registration request message through the RRC message, the UE transfers, to the RAN, the NID along with the GUAMI (or 5G-GUTI). The operation in which the UE includes the NID together with the GUAMI (or 5G-GUTI) in the AN parameter is equally applied not only to the registration request but also to other initial NAS messages. For example, for a service request, a deregistration request, or a control plane service request message, when the UE carries a corresponding initial NAS message on an RRC message to the RAN, the UE carries an AN parameter including the GUAMI (or 5G-GUTI) and the NID together.

However, when the RAN receiving the GUAMI (or 5G-GUTI) and the NID is unable to route to the AMF corresponding to the GUAMI (or the GUAMI obtained from the 5G-GUTI), the RAN may select an appropriate new AMF 220 from network B to be accessed (operation 211) and transfer the registration request message to the selected AMF (operation 212).

Meanwhile, when creating the registration request message, the UE may include, in the registration request message, the 5G-GUTI allocated from the old AMF 240 and the NID of network A which is the SNPN having allocated the 5G-GUTI and apply integrity protection for the registration request message using the security key that has been used in network A.

The new AMF receiving the registration request message may include the registration request message received from the UE to request the UE context for the UE from the old AMF, based on the 5G-GUTI and NID information included in the registration request message (operation 221). In an embodiment, the UE may transmit a UE context transfer request message (e.g., UEContextTransfer message) including the registration request message received from the UE to the old AMF to request the UE context. The old AMF receiving the request for UE context may perform authentication on the registration request message and, if correctly authenticated, transfer a response to the request, along with the UE context, to the new AMF (operation 242). In an embodiment, the old AMF may transmit a UE context transfer response message (e.g., a UEContextTransfer Response message) including the UE context to the new AMF.

Accordingly, when the new AMF finds out that authentication is correct, the new AMF may not perform a separate authentication procedure on the UE, and may share a security context for safe message transmission/reception between the UE and the new AMF (operation 222). Further, the new AMF may notify the old AMF that the UE context is successfully transferred and the UE is registered through the new AMF (operation 223). In an embodiment, the new AMF may transmit a registration status update message (e.g., a registrationStatusUpdate message) to the old AMF to notify that the UE context is successfully transferred and the UE is registered through the new AMF.

Meanwhile, in operation 242, the new AMF may obtain information about the PDU session in which the UE is receiving the service in the network from the received UE context. For example, the new AMF may obtain information such as the PDU session ID, the ID of the SMF managing the PDU session ID, or the IP address of the SMF and perform a procedure for reactivating the PDU session through the SMF. For example, PDUSession_UpdateSMContext is sent to the SMF to inform that the AMF in which the UE is registered has been changed to the new AMF so that the UE may continuously use the PDU session even after the new registration procedure.

In particular, when the network where the UE has been allocated the 5G-GUTI and the network to which the UE is to access differ from each other as in the disclosure, the new AMF may select an appropriate v-SMF in network B which is the network where it belongs and send, to the SMF, a PDUSession_UpdateSMContext through the selected v-SMF to inform that the AMF where the UE has been registered has been changed to the new AMF and that the PDU session service is used through the v-SMF in network B which is the new network, and the v-SMF may select a v-UPF for serving the PDU session and make settings for serving the PDU session in the new network.

The v-SMF attempts to include information about the v-SMF and information about the v-UPF in the SM context update request for the PDU session received from the AMF and send it to the SMF. However, since no interface is created between the v-SMF and the SMF, the above-described process of reactivating the PDU session inevitably fails (operation 224).

Further, the new AMF obtains information that the old AMF event-subscribes to for the UE from the UE context received in operation 242. For example, the new AMF obtains the PCF ID and address information for the event subscription for informing that the policy is modified from the policy control function (PCF) or the UDM ID and address information for the event subscription for informing that subscription information is modified from the unified data management (UDM) and informs that the AMF where the UE has been registered has been changed to the new AMF to allow it to continuously receive the service. However, when the network where the UE is allocated the 5G-GUTI and the network which the UE is to newly access differ from each other as in the case, since there is no association between the new AMF and the PCF or UDM of network A which is the existing access network, the attempt to modify the existing event subscription to the new AMF inevitably fails.

Therefore, the registration procedure may be delayed due to the procedure of modifying the SM context and modifying the event subscription as in operation 224, or resource waste may occur due to unnecessary operations performed in the new network. A method for eliminating such delay and resource waste is described in subsequent embodiments.

Meanwhile, the new AMF transfers the result of UE registration to the UE by allocating a new 5G-GUTI (operation 225) and, in response thereto, performs registration complete to finish the registration procedure (operation 203). In an embodiment, the new AMF may transmit a registration accept message including the 5G-GUTI newly allocated to the UE to the UE and receive a registration complete message from the UE, thereby finishing the registration procedure.

Figure 3A:
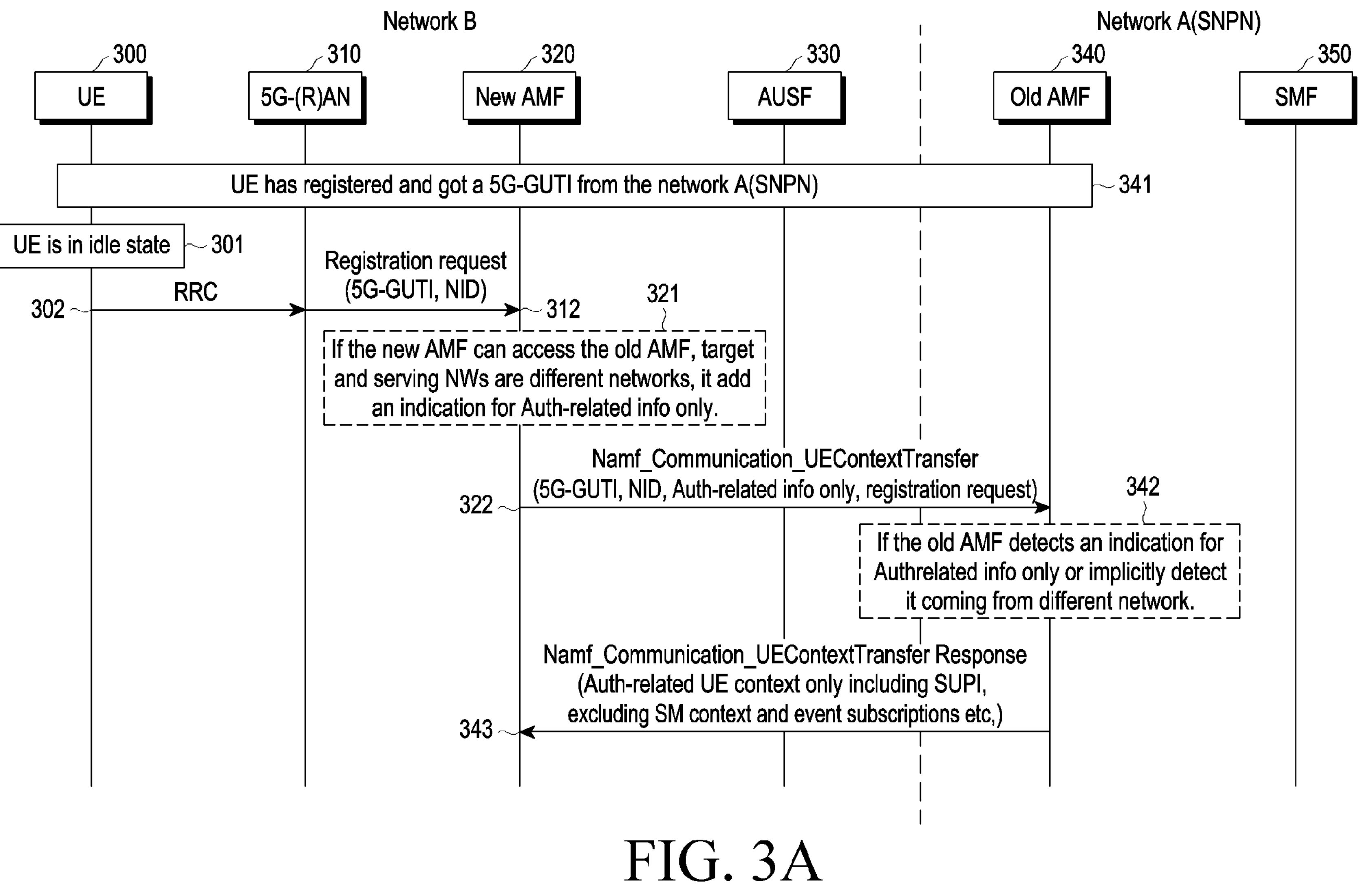
FIGS. 3A and 3B are views illustrating a procedure for network registration by a UE in a new communication network when a communication network having allocated the UE's temporary ID is an SNPN according to an embodiment of the disclosure.
Figure 3B:
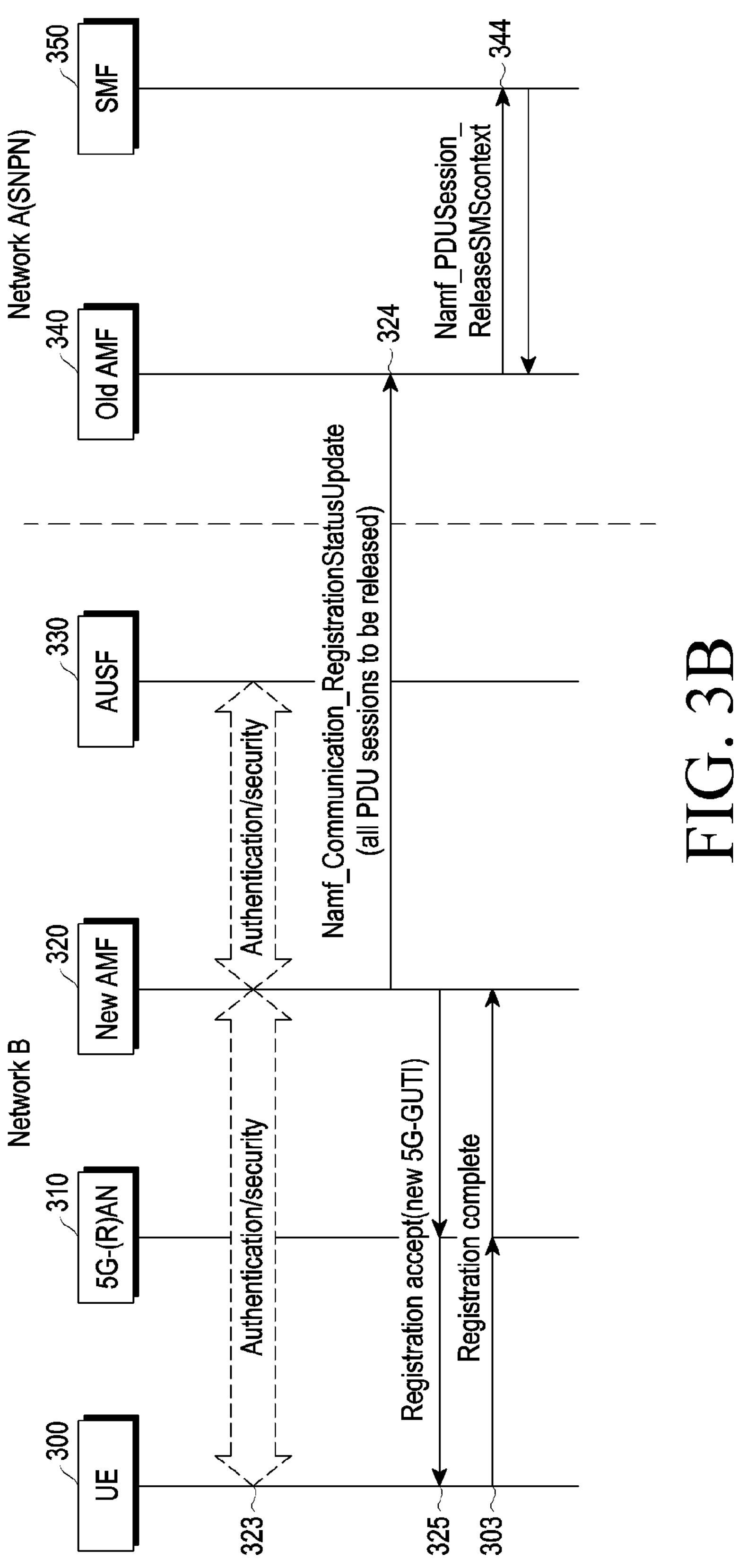

FIGS. 3A and 3B are views illustrating a procedure for network registration by a UE in a new communication network when a communication network having allocated the UE's temporary ID is an SNPN according to an embodiment of the disclosure.

Referring to FIG. 3, when a UE registers in network A which is an SNPN, the UE may be allocated a temporary ID (e.g., 5G-GUTI) from the old AMF 340 (operation 341). Thereafter, when the UE moves to network B, the UE may recognize that the movement from network A to network B is a movement between different SNPNs or a movement between SNPN and PLMN through network information (e.g., a PLMN ID or an NID)) broadcast by a RAN. Accordingly, the UE may recognize that handover is not supported and operate as in the idle state (operation 301).

Meanwhile, in the idle state, the UE may transfer a registration request message to the RAN 310 through the RRC message in network B which is the moved network (operation 302), and the RAN 310 may select a new AMF 320 and transfer the registration request message (operation 312).

Meanwhile, when creating the registration request message, the UE may include, in the registration request message, the 5G-GUTI allocated from the old AMF 340 and the NID of network A which is the SNPN having allocated the 5G-GUTI and apply integrity protection for the registration request message using the security key that has been used in network A.

If knowing that access is possible because there is an interface with the old AMF 340 based on the GUAMI and NID information obtained through the 5G-GUTI included in the registration request message, the new AMF receiving the registration request message may include the registration request message received from the UE and request the UE context for the UE from the old AMF (operation 322). In an embodiment, the UE may transmit a UE context transfer request message (e.g., UEContextTransfer message) including the registration request message received from the UE to the old AMF to request the UE context.

In this case, if recognizing that the network (target network) of the new AMF and the network (serving network) having allocated the 5G-GUTI to the UE are different networks, the new AMF may include, in the message of operation 322, an indication that only the UE's authentication-related UE context is to be transferred, an indication that only MM UE context including the UE's SUPI is to be transferred, or an indication that the SM UE context is not to be transferred (operation 321). The new AMF may separately include the 5G-GUTI and NID information and transfer them for the old AMF to quickly determine the transferred UE context request. In an embodiment, the authentication-related UE context includes the UE's SUPI. Further, the authentication-related UE context may further include at least one of routing indicator, ausf group ID, UDM group ID, PCF group ID, SUPI-unautheticatedindicator, GPSI, 5G-GUTI, PEI, Internal group ID list, access type or security information or such security-related information.

The old AMF receiving the request for UE context may perform authentication on the registration request message and, if correctly authenticated, transfer a response to the request, along with the UE context, to the new AMF (operation 343). In this case, when receiving the indication that only the authentication-related UE context including the UE's SUPI is to be transferred, the indication that only MM UE context including the UE's SUPI is to be transferred, or the indication that the SM UE context is not to be transferred, the old AMF may include only the authentication-related UE context including the SUPI or include only the MM UE context including the SUPI among the UE contexts or exclude the UE contexts except for the SM UE context and transfer them to the new AMF 320 and may transfer it to the new AMF while excluding information (and/or association information with another NF) event-subscribed by the old AMF. In an embodiment, the old AMF may transmit, to the new AMF, a UE context transfer response message (e.g., UEContextTransfer Response message) which includes the authentication-related UE context or MM UE context including the UE's SUPI and excludes the SM UE context and/or event subscription information. As such, through an explicit indication, the old AMF may transmit, to the new AMF, only authentication-related UE context or MM UE context including the UE's SUPI except for the SM UE context and/or event subscription information. Thus, it is possible to address network access delay and resource waste due to unnecessary operations based on the SM UE context and/or event subscription information.

Further, when recognizing that the new AMF requesting the UE context belongs to a different network than that of the old AMF, or the network of the old AMF or the network where the new AMF belongs are SNPNs, although there is no separate indication, in operation 343, the old AMF may include only the authentication-related UE context including the SUPI among the UE contexts, include only the MM UE context including the SUPI, or exclude the SM UE context and transfer them to the new AMF 320 and may transfer it to the new AMF with the information (and/or association information with another NF) event subscribed by the old AMF excluded. In other words, although there is no explicit indication, if a preset condition is met (e.g., when the old AMF recognizes that the new AMF requesting the UE context belongs to a different network from the network of the old AMF and that at least one of its network or the network where the new AMF belongs is an SNPN), the old AMF may transmit, to the new AMF, only authentication-related UE context or MM UE context including the UE's SUPI with the SM UE context and/or event subscription information excluded. Thus, it is possible to address network access delay and resource waste due to unnecessary operations based on the SM UE context and/or event subscription information.

According to operation 343, when the new AMF finds out that authentication is correct, the new AMF may not perform a separate authentication procedure on the UE, and may share a security context for safe message transmission/reception between the UE and the new AMF (operation 323). Further, the new AMF may notify the old AMF that the UE context is successfully transferred and the UE is registered through the new AMF (operation 324). In an embodiment, the new AMF may transmit a registration status update message (e.g., a registrationStatus Update message) to the old AMF to notify that the UE context is successfully transferred and the UE is registered through the new AMF.

In this case, the new AMF may send an indication that all PDU sessions for the UE may be released. Although the list of PDU session IDs serving the UE and the ID and address of the SMF managing each thereof are obtained in operation 343, the new AMF may transfer to the old AMF, an indication that a list of all PDU session IDs is included or all PDU sessions may be released, and the old AMF 340 receiving the list of PDU sessions to be released or the indication that all PDU sessions may be released may request the corresponding SMFs to release the corresponding PDU sessions (operation 344).

The operation of requesting each SMF to local-release the PDU session in the UE's SM context of operation 344 may be performed after receiving the list of PDU sessions or the indication of operation 324 but, according to an embodiment, may be performed immediately after determining not to send the UE's SM context to the new AMF in operation 342.

Meanwhile, the new AMF transfers the result of UE registration to the UE by allocating a new 5G-GUTI (operation 325) and, in response thereto, performs registration complete to finish the registration procedure (operation 303). In an embodiment, the new AMF may transmit a registration accept message including the 5G-GUTI newly allocated to the UE to the UE and receive a registration complete message from the UE, thereby finishing the registration procedure.

Figure 4:
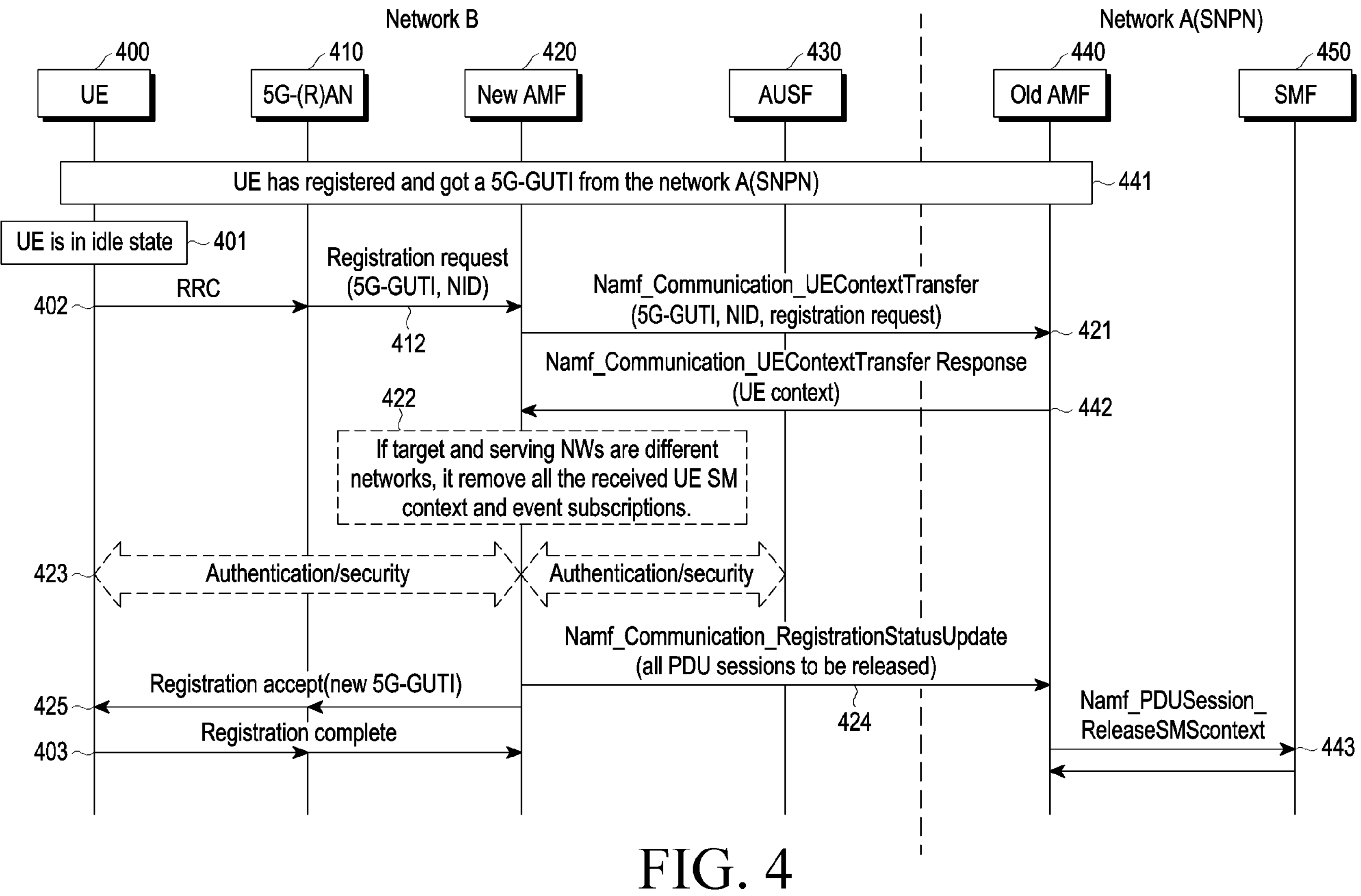
FIG. 4 is a view illustrating a procedure for network registration by a UE in a new communication network when a communication network having allocated the UE's temporary ID is an SNPN according to another embodiment of the disclosure.

FIG. 4 is a view illustrating a procedure for network registration by a UE in a new communication network when a communication network having allocated the UE's temporary ID is an SNPN according to another embodiment of the disclosure.

Referring to FIG. 4, when a UE registers in network A which is an SNPN, the UE may be allocated a temporary ID (e.g., 5G-GUTI) from the old AMF 340 (operation 441). Thereafter, when the UE moves to network B, and the UE recognizes that the movement from network A to network B is a movement between different SNPNs or a movement between SNPN and PLMN through network information (e.g., a PLMN ID or an NID)) broadcast by a RAN, the UE may recognize that handover is not supported and accordingly operate in the idle state (operation 401).

Meanwhile, in the idle state, the UE may transfer a registration request message to the RAN 410 through the RRC message in network B which is the moved network (operation 402), and the RAN 410 may select a new AMF 420 and transfer the registration request message (operation 412).

Meanwhile, when creating the registration request message, the UE may include, in the registration request message, the 5G-GUTI allocated from the old AMF 440 and the NID of network A which is the SNPN having allocated the 5G-GUTI and apply integrity protection for the registration request message using the security key that has been used in network A.

If knowing that access is possible because there is an interface with the old AMF 440 based on the GUAMI and NID information obtained through the 5G-GUTI included in the registration request message, the new AMF receiving the registration request message may include the registration request message received from the UE and request the UE context for the UE from the old AMF (operation 421). In an embodiment, the UE may transmit a UE context transfer request message (e.g., UEContextTransfer message) including the registration request message received from the UE to the old AMF to request the UE context. Further, the new AMF may separately include the 5G-GUTI and NID information and transfer them for the old AMF to quickly determine the transferred UE context request.

The old AMF receiving the request for UE context may perform authentication on the registration request message and, if correctly authenticated, transfer a response to the request, along with the UE context, to the new AMF (operation 442).

If recognizing that the network of the new AMF and the network having allocated the 5G-GUTI to the UE are different networks and that the new AMF or the old AMF is in an SNPN-type network, the new AMF receiving the UE context may delete all received UE SM contexts and the information (and/or association information with another NF) event-subscribed by the old AMF (operation 422). As such, although the SM UE context and/or the UE context including event subscription information is received, if a preset condition is met (e.g., when the new AMF recognizes that the network having allocated the 5G-GUTI to the UE belongs to a different network from its network, and at least one of its network or the network where the new AMF belongs is an SNPN), the new AMF may delete the SM UE context and/or event subscription information. Thus, it is possible to address network access delay and resource waste due to unnecessary operations based on the SM UE context and/or event subscription information.

According to operation 442, when the new AMF finds out that authentication is correct, the new AMF may not perform a separate authentication procedure on the UE, and may share a security context for safe message transmission/reception between the UE and the new AMF (operation 423). Further, the new AMF may notify the old AMF that the UE context is successfully transferred and the UE is registered through the new AMF (operation 424). In an embodiment, the new AMF may transmit a registration status update message (e.g., a registrationStatus Update message) to the old AMF to notify that the UE context is successfully transferred and the UE is registered through the new AMF.

In this case, the new AMF may send an indication that all PDU sessions for the UE may be released. For example, in step 442, the new AMF may include the list of all PDU session IDs or transfer, to the old AMF, an indication that all PDU sessions may be released, along with, e.g., a registration status update message, based on information, such as the list of PDU session IDs serving the UE and the ID and address of the SMF managing each. The old AMF 440 receiving the list of PDU sessions to be released or the indication that all PDU sessions may be released may request the corresponding SMFs to release the corresponding PDU sessions (operation 443).

Meanwhile, the new AMF transfers the result of UE registration to the UE by allocating a new 5G-GUTI (operation 425) and, in response thereto, performs registration complete to finish the registration procedure (operation 403). In an embodiment, the new AMF may transmit a registration accept message including the 5G-GUTI newly allocated to the UE to the UE and receive a registration complete message from the UE, thereby finishing the registration procedure.

Figure 5A:
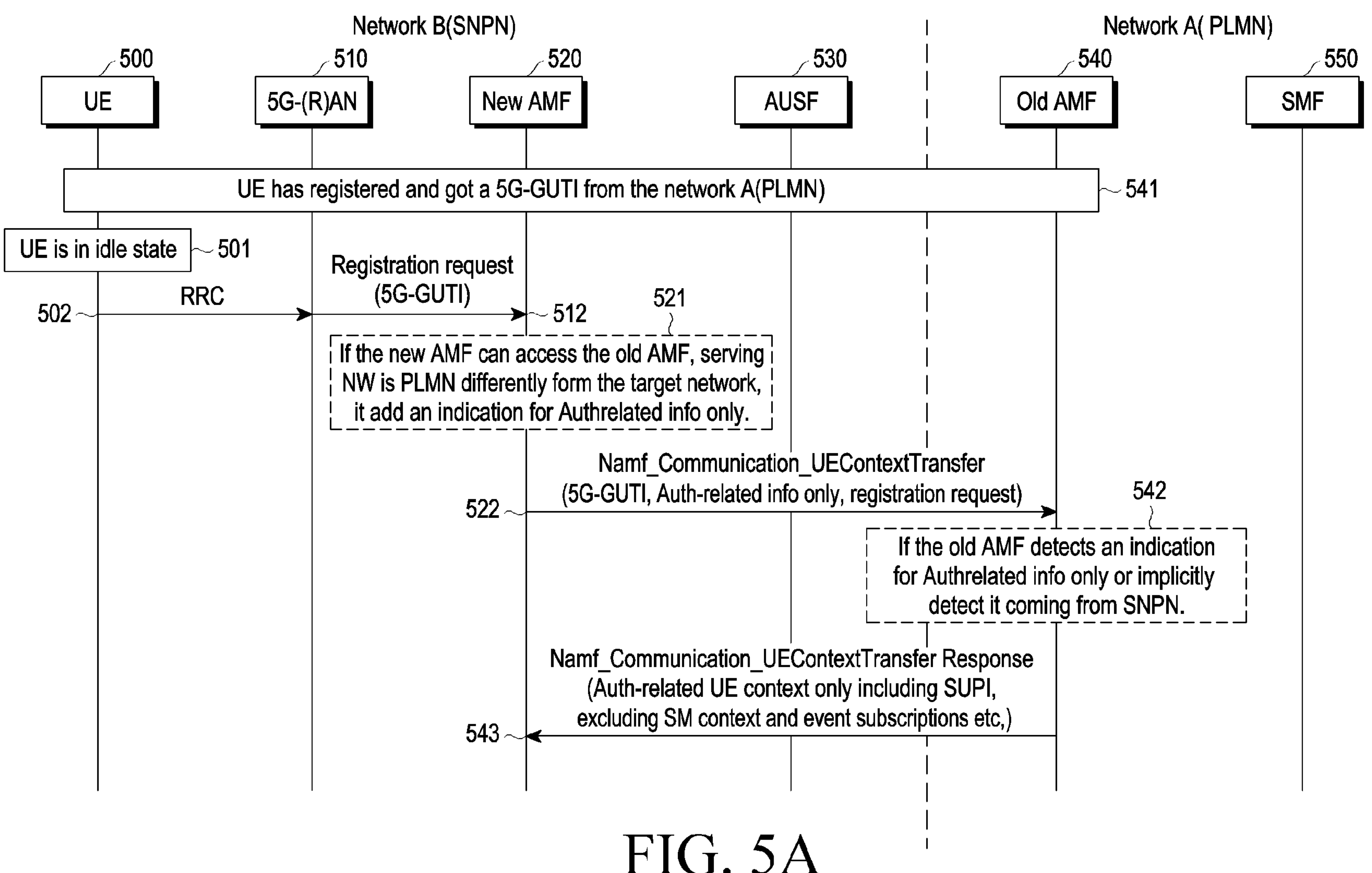
FIGS. 5A and 5B are views illustrating a procedure for network registration by a UE in a new SNPN when a communication network having allocated the UE's temporary ID is a PLMN according to an embodiment of the disclosure.
Figure 5B:
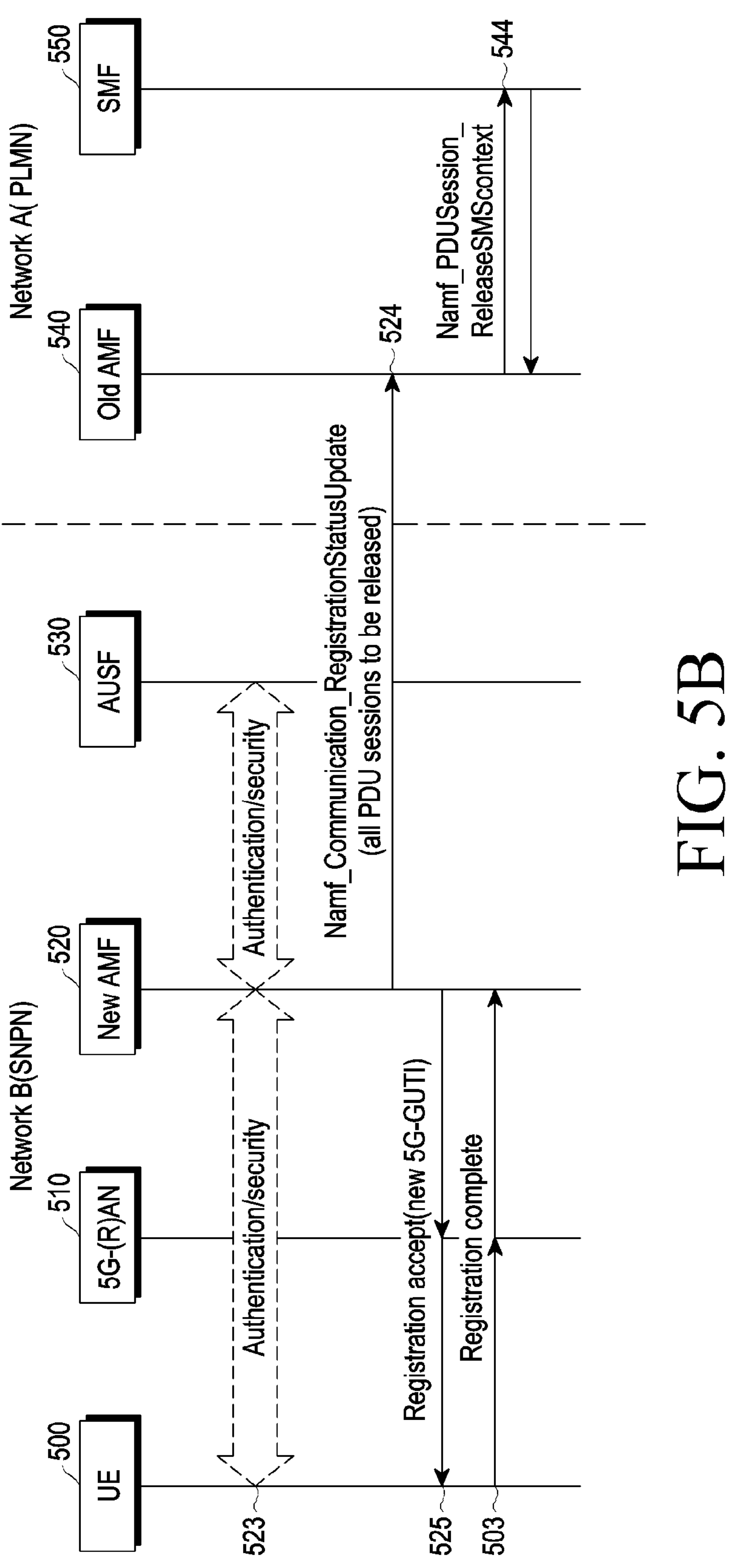

FIGS. 5A and 5B are views illustrating a procedure for network registration by a UE in a new SNPN when a communication network having allocated the UE's temporary ID is a PLMN according to an embodiment of the disclosure.

Referring to FIG. 5, when a UE registers in network A which is a public network, the UE may be allocated a temporary ID (e.g., 5G-GUTI) from the old AMF 540 (operation 541). Thereafter, when the UE moves to network B which is an SNPN, the UE may recognize that the movement from network A to network B is a movement between different SNPNs or a movement between SNPN and PLMN through network information (e.g., a PLMN ID or an NID)) broadcast by a RAN. Accordingly, the UE may recognize that handover is not supported and operate as in the idle state (operation 501).

Meanwhile, in the idle state, the UE may transfer a registration request message to the RAN 510 through the RRC message in network B which is the moved network (operation 502), and the RAN 510 may select a new AMF 520 and transfer the registration request message (operation 512).

Meanwhile, when creating the registration request message, the UE may include, in the registration request message, the 5G-GUTI allocated from the old AMF 540 and apply integrity protection for the registration request message using the security key that has been used in network A.

If knowing that access is possible because there is an interface with the old AMF 540 in the public network (PLMN) when identifying that only the GUAMI obtained through the 5G-GUTI included in the registration request message is present, but NID information is absent, the new AMF receiving the registration request message may include the registration request message received from the UE and request the UE context for the UE from the old AMF (operation 522). In an embodiment, the UE may transmit a UE context transfer request message (e.g., UEContextTransfer message) including the registration request message received from the UE to the old AMF to request the UE context.

In this case, if the new AMF recognizes that its network and if the network having allocated the 5G-GUTI to the UE are different networks, and at least one of its network and the network of the old AMF is an SNPN or if the network having allocated the 5G-GUTI is a PLMN and the new AMF is in an SNPN, the new AMF may include, in the memory of operation 522, an indication that only the UE's authentication-related UE context is to be transferred, an indication that only the MM UE context including the UE's SUPI is to be transferred, or an indication that the SM UE context is not to be transferred (operation 521). The new AMF may separately include and transfer the 5G-GUTI for the old AMF to quickly determine the transferred UE context request. Or, the new AMF may separately transfer information (no NID information) indicating that there is no NID and the 5G-GUTI for the old AMF to quickly determine the transferred UE context request.

The old AMF receiving the request for UE context may perform authentication on the registration request message and, if correctly authenticated, transfer a response to the request, along with the UE context, to the new AMF (operation 543). In this case, when receiving the indication that only the authentication-related UE context including the UE's SUPI is to be transferred, the indication that only MM UE context including the UE's SUPI is to be transferred, or the indication that the SM UE context is not to be transferred, the old AMF may include only the authentication-related UE context including the SUPI or include only the MM UE context including the SUPI among the UE contexts or exclude the UE contexts except for the SM UE context and transfer them to the new AMF 520 and may transfer it to the new AMF while excluding information (and/or association information with another NF) event-subscribed by the old AMF. In an embodiment, the old AMF may transmit, to the new AMF, a UE context transfer response message (e.g., UEContextTransfer Response message) which includes the authentication-related UE context or MM UE context including the UE's SUPI and excludes the SM UE context and/or event subscription information. As such, through an explicit indication, the old AMF may transmit, to the new AMF, only authentication-related UE context or MM UE context including the UE's SUPI except for the SM UE context and/or event subscription information. Thus, it is possible to address network access delay and resource waste due to unnecessary operations based on the SM UE context and/or event subscription information.

Further, when recognizing that the new AMF requesting the UE context belongs to a different network than that of the old AMF, or the network of the old AMF or the network where the new AMF belongs are SNPNs, although there is no separate indication, in operation 543, the old AMF may include only the authentication-related UE context including the SUPI among the UE contexts, include only the MM UE context including the SUPI, or exclude the SM UE context and transfer them to the new AMF 520 and may transfer it to the new AMF with the information (and/or association information with another NF) event subscribed by the old AMF excluded. In other words, although there is no explicit indication, if a preset condition is met (e.g., when the old AMF recognizes that the new AMF requesting the UE context belongs to a different network from the network of the old AMF and that at least one of its network or the network where the new AMF belongs is an SNPN), the old AMF may transmit, to the new AMF, only authentication-related UE context or MM UE context including the UE's SUPI with the SM UE context and/or event subscription information excluded. Thus, it is possible to address network access delay and resource waste due to unnecessary operations based on the SM UE context and/or event subscription information.

According to operation 543, when the new AMF finds out that authentication is correct, the new AMF may not perform a separate authentication procedure on the UE, and may share a security context for safe message transmission/reception between the UE and the new AMF (operation 523). Further, the new AMF may notify the old AMF that the UE context is successfully transferred and the UE is registered through the new AMF (operation 524). In an embodiment, the new AMF may transmit a registration status update message (e.g., a registrationStatus Update message) to the old AMF to notify that the UE context is successfully transferred and the UE is registered through the new AMF.

In this case, the new AMF may send an indication that all PDU sessions for the UE may be released. Although the list of PDU session IDs serving the UE and the ID and address of the SMF managing each thereof are obtained in operation 543, the new AMF may transfer to the old AMF, an indication that a list of all PDU session IDs is included or all PDU sessions may be released, and the old AMF 540 receiving the list of PDU sessions to be released or the indication that all PDU sessions may be released may request the corresponding SMFs to release the corresponding PDU sessions (operation 544).

The operation of requesting each SMF to local-release the PDU session in the UE's SM context of operation 544 may be performed after receiving the list of PDU sessions or the indication of operation 524 but, according to an embodiment, may be performed immediately after determining not to send the UE's SM context to the new AMF in operation 542.

Meanwhile, the new AMF transfers the result of UE registration to the UE by allocating a new 5G-GUTI (operation 525) and, in response thereto, performs registration complete to finish the registration procedure (operation 503). In an embodiment, the new AMF may transmit a registration accept message including the 5G-GUTI newly allocated to the UE to the UE and receive a registration complete message from the UE, thereby finishing the registration procedure.

Figure 6:
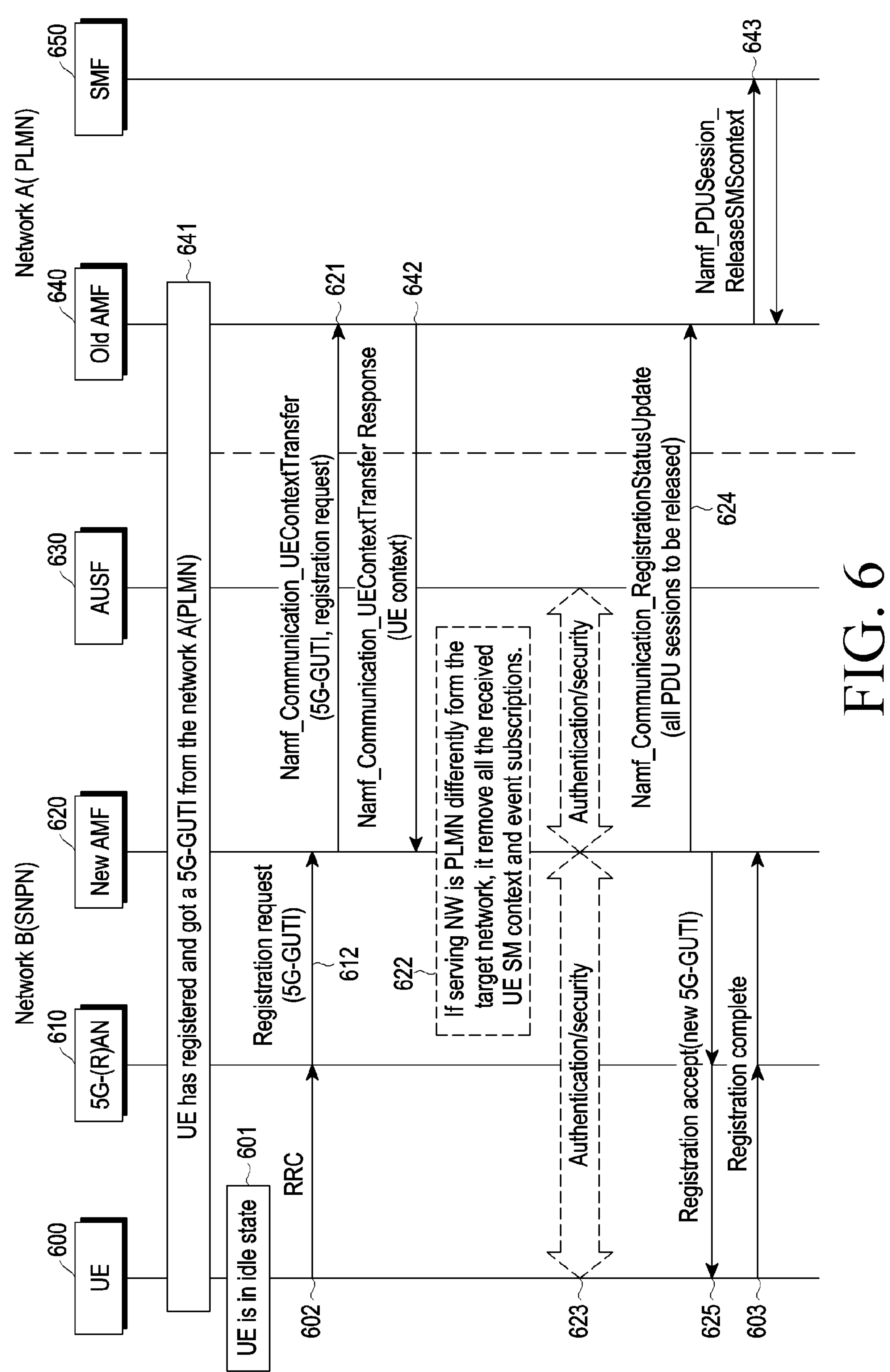
FIG. 6 is a view illustrating a procedure for network registration by a UE in a new SNPN when a communication network having allocated a UE's temporary ID is an PLMN according to another embodiment of the disclosure.

FIG. 6 is a view illustrating a procedure for network registration by a UE in a new SNPN when a communication network having allocated a UE's temporary ID is an PLMN according to another embodiment of the disclosure.

Referring to FIG. 6, when a UE registers in network A which is a public network, the UE may be allocated a temporary ID (e.g., 5G-GUTI) from the old AMF 640 (operation 641). Thereafter, when the UE moves to network B, and the UE recognizes that the movement from network A to network B is a movement between different SNPNs or a movement between SNPN and PLMN through network information (e.g., a PLMN ID or an NID)) broadcast by a RAN, the UE may recognize that handover is not supported and accordingly operate in the idle state (operation 601).

Meanwhile, in the idle state, the UE may transfer a registration request message to the RAN 610 through the RRC message in network B which is the moved network (operation 602), and the RAN 610 may select a new AMF 620 and transfer the registration request message (operation 612).

Meanwhile, when creating the registration request message, the UE may include, in the registration request message, the 5G-GUTI allocated from the old AMF 640 and apply integrity protection for the registration request message using the security key that has been used in network A.

If knowing that access is possible because there is an interface with the old AMF 540 in the PLMN by obtaining the GUAMI through the 5G-GUTI included in the registration request message and identifying that no NID is included in the registration request message, the new AMF receiving the registration request message may include the registration request message received from the UE and request the UE context for the UE from the old AMF (621). In an embodiment, the UE may transmit a UE context transfer request message (e.g., UEContextTransfer message) including the registration request message received from the UE to the old AMF to request the UE context. Further, the new AMF may separately include and transfer information (no NID information) indicating that there is no NID and the 5G-GUTI for the old AMF to quickly determine the transferred UE context request.

The old AMF receiving the request for UE context may perform authentication on the registration request message and, if correctly authenticated, transfer a response to the request, along with the UE context, to the new AMF (operation 642).

If it is recognized that the network of the new AMF and the network having allocated the 5G-GUTI to the UE are different networks and if at least one of its network and the network of the old AMF is an SNPN or if the network having allocated the 5G-GUTI is a PLMN and the new AMF is in an SNPN, the new AMF receiving the UE context may delete all received UE SM contexts and the information (and/or association information with another NF) event-subscribed by the old AMF (operation 622). As such, although the SM UE context and/or the UE context including event subscription information is received, if a preset condition is met (e.g., when the new AMF recognizes that the network having allocated the 5G-GUTI to the UE belongs to a different network from its network, and at least one of its network or the network where the new AMF belongs is an SNPN), the new AMF may delete the SM UE context and/or event subscription information. Thus, it is possible to address network access delay and resource waste due to unnecessary operations based on the SM UE context and/or event subscription information.

According to operation 642, when the new AMF finds out that authentication is correct, the new AMF may not perform a separate authentication procedure on the UE, and may share a security context for safe message transmission/reception between the UE and the new AMF (operation 623). Further, the new AMF may notify the old AMF that the UE context is successfully transferred and the UE is registered through the new AMF (operation 624). In an embodiment, the new AMF may transmit a registration status update message (e.g., a registrationStatusUpdate message) to the old AMF to notify that the UE context is successfully transferred and the UE is registered through the new AMF.

In this case, the new AMF may send an indication that all PDU sessions for the UE may be released. For example, in step 642, the new AMF may include the list of all PDU session IDs or transfer, to the old AMF, an indication that all PDU sessions may be released, along with, e.g., a registration status update message, based on information, such as the list of PDU session IDs serving the UE and the ID and address of the SMF managing each. The old AMF 640 receiving the list of PDU sessions to be released or the indication that all PDU sessions may be released may request the corresponding SMFs to release the corresponding PDU sessions (operation 643).

Meanwhile, the new AMF transfers the result of UE registration to the UE by allocating a new 5G-GUTI (operation 625) and, in response thereto, performs registration complete to finish the registration procedure (operation 603). In an embodiment, the new AMF may transmit a registration accept message including the 5G-GUTI newly allocated to the UE to the UE and receive a registration complete message from the UE, thereby finishing the registration procedure.

Figure 7:
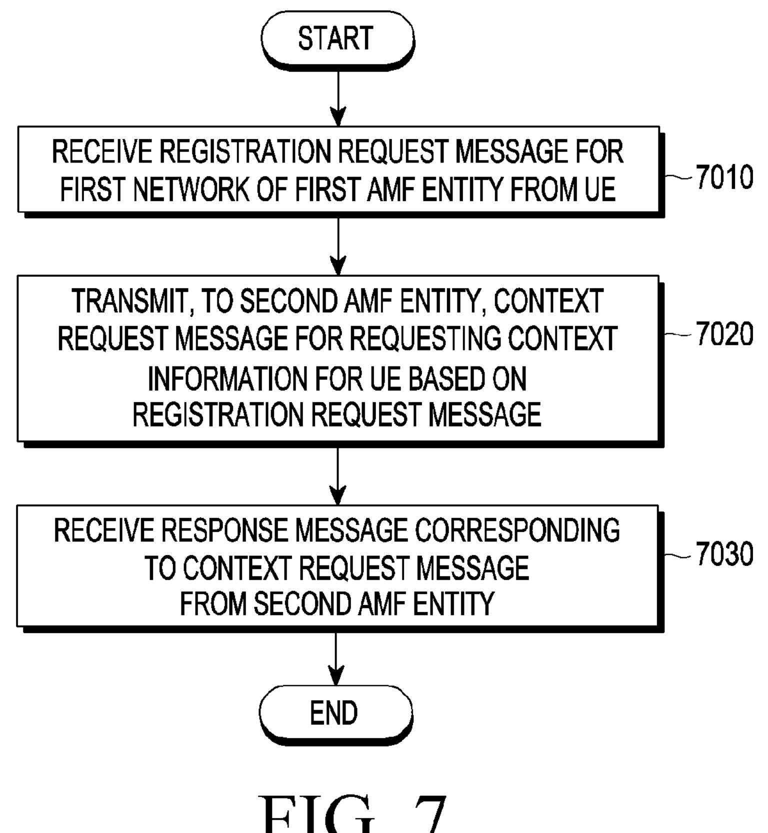
FIG. 7 illustrates a method by a first AMF entity according to an embodiment of the disclosure.

FIG. 7 illustrates a method by a first AMF entity according to an embodiment of the disclosure.

In the embodiment of FIG. 7, the first AMF entity may correspond to the new AMF of network B of FIGS. 2 to 6, and the second AMF entity may correspond to the old AMF of network A of FIGS. 2 to 6. Further, the UE may correspond to the UE of FIGS. 2 to 6, and the base station may correspond to the 5G-(R)AN of FIGS. 2 to 6.

Referring to FIG. 7, the first AMF entity may receive a registration request message for the first network of the first AMF entity from the UE via the base station (7010). The operation of receiving the registration request message may refer to, e.g., the operation of receiving the registration request message of FIGS. 2 to 6.

The first AMF entity may transmit a context request message requesting context information for the UE to the second AMF entity based on the registration request message (7020). The operation of transmitting the context request message may refer to, e.g., the operation of transmitting the UEContextTransfer message of FIGS. 2 to 6.

The first AMF entity may receive a response message corresponding to the context request message from the second AMF entity (7030). The operation of receiving the response message may refer to, e.g., the operation of receiving the UEContextTransfer Response message of FIGS. 2 to 6.

In an embodiment, the registration request message may include temporary ID information of the UE allocated by the second AMF.

In an embodiment, at least one of the first network of the first AMF entity or the second network of the second AMF entity may correspond to an SNPN.

In an embodiment, the response message may include at least part of context information stored in the second AMF entity.

In an embodiment, the context information may include at least one of information for mobility management of the UE, authentication-related context information, information for session management for a service provided to the UE, or event subscription-related information for the UE.

In an embodiment, when the second network of the second AMF entity is an SNPN, the registration request message may include network ID information for identifying the second network, and the context request message may include temporary ID information and network ID information.

In an embodiment, the context request message may include an indication for requesting to transmit only authentication-related context information including the SUPI of the UE, and the response message may include only authentication-related context information including the SUPI of the UE.

In an embodiment, when the response message includes information for session management for a service provided to the UE and event subscription-related information for the UE, the first AMF entity may delete the information for session management and the event subscription-related information.

In an embodiment, the first AMF entity may transmit, to the second AMF entity, a request for releasing all PDU sessions for the UE.

Figure 8:
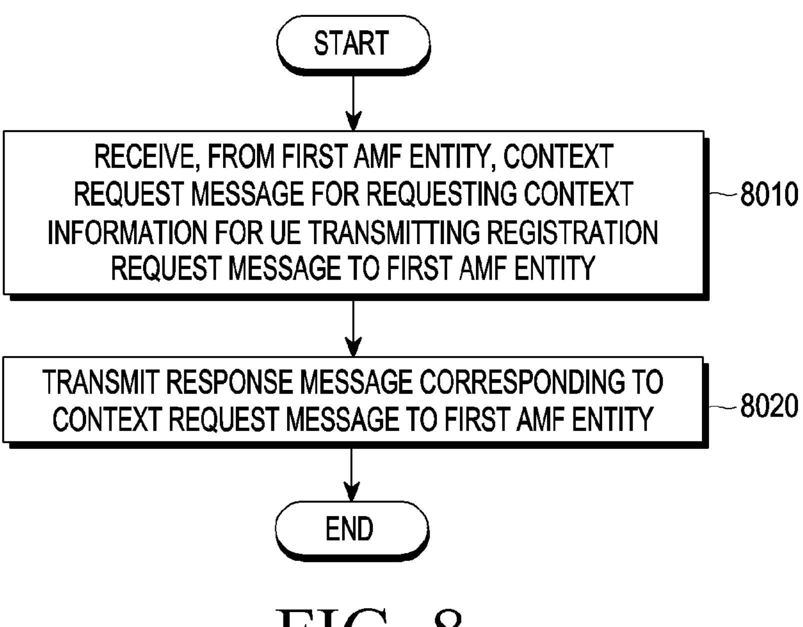
FIG. 8 illustrates a method by a second AMF entity according to an embodiment of the disclosure.

FIG. 8 illustrates a method by a second AMF entity according to an embodiment of the disclosure.

In the embodiment of FIG. 8, the first AMF entity may correspond to the new AMF of network B of FIGS. 2 to 6, and the second AMF entity may correspond to the old AMF of network A of FIGS. 2 to 6. Further, the UE may correspond to the UE of FIGS. 2 to 6, and the base station may correspond to the 5G-(R)AN of FIGS. 2 to 6.

Referring to FIG. 8, the second AMF entity may receive, from the first AMF entity, a context request message for requesting context information for the UE that has transmitted the registration request message to the first AMF entity (8010). The operation of receiving the context request message may refer to, e.g., the operation of receiving the UEContextTransfer message of FIGS. 2 to 6.

The second AMF entity may transmit a response message corresponding to the context request message to the first AMF entity (8020). The operation of transmitting the response message may refer to, e.g., the operation of transmitting the UEContextTransfer Response message of FIGS. 2 to 6.

In an embodiment, at least one of the first network of the first AMF entity or the second network of the second AMF entity may correspond to an SNPN.

In an embodiment, the response message may include at least part of context information stored in the second AMF entity.

In an embodiment, the context information may include at least one of information for mobility management of the UE, authentication-related context information, information for session management for a service provided to the UE, or event subscription-related information for the UE.

In an embodiment, when the second network of the second AMF entity is an SNPN, the registration request message may include network ID information for identifying the second network, and the context request message may include the UE's temporary ID information and network ID information.

In an embodiment, when the second AMF entity identifies that the context request message includes an indication for requesting to transmit only authentication-related context information including the UE's SUPI, the step of including only authentication-related context information including the UE's SUPI in the response message may be included.

In an embodiment, when the second AMF entity identifies that the first AMF belongs to a network different from the second AMF and at least one of the first network or the second network is an SNPN, the second AMF entity may not include information for session management and event subscription-related information in the response message.

In an embodiment, the second AMF entity may receive a request for releasing all PDU sessions for the UE from the first AMF entity.

Figure 9:
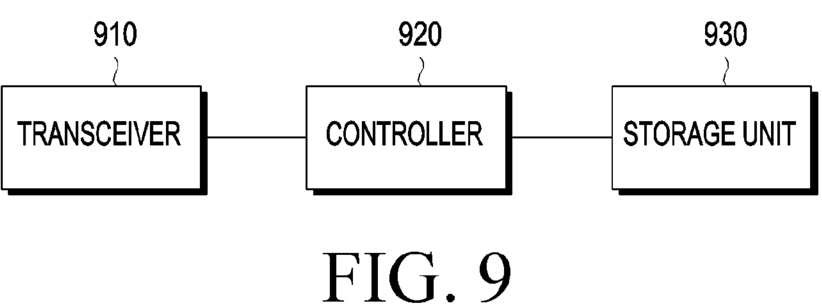
FIG. 9 is a view illustrating a structure of a UE according to an embodiment of the disclosure.

FIG. 9 is a view illustrating a structure of a UE according to an embodiment of the disclosure.

Referring to FIG. 9, the UE may include a transceiver 910, a controller 920, and a storage unit 930. In the disclosure, the controller may be defined as a circuit or application-specific integrated circuit or at least one processor.

The transceiver 910 may transmit and receive signals to/from other network entities. The transceiver 910 may receive system information from, e.g., a base station, and may receive a synchronization signal or a reference signal.

The controller 920 may control the overall operation of the terminal according to an embodiment. For example, the controller 920 may control inter-block signal flow to perform the operations according to FIGS. 2 to 7 described above. Specifically, the controller 920 may control the operations proposed in the present invention to support UE mobility according to an embodiment of the present invention.

The storage unit 930 may store at least one of information transmitted/received via the transceiver 910 and information generated via the controller 920. For example, the storage unit 930 may store, e.g., the UE's temporary ID information and the network's ID information.

Figure 10:
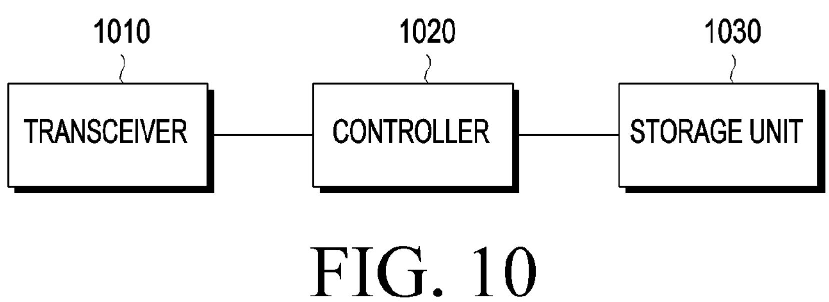
FIG. 10 is a view illustrating a structure of a base station according to an embodiment of the disclosure.

FIG. 10 is a view illustrating a structure of a base station according to an embodiment of the disclosure.

Referring to FIG. 10, the base station may include a transceiver 1010, a controller 1020, and a storage unit 1030. In the disclosure, the controller may be defined as a circuit or application-specific integrated circuit or at least one processor.

The transceiver 1010 may transmit and receive signals to/from other network entities. For example, the transceiver 1010 may transmit system information to the UE and may transmit a synchronization signal or a reference signal.

The controller 1020 may control the overall operation of the base station according to an embodiment. For example, the controller 1020 may control inter-block signal flow to perform the operations according to FIGS. 2 to 7 described above. Specifically, the controller 1020 may control the operations proposed in the present invention to support UE mobility according to an embodiment of the present invention.

The storage unit 1030 may store at least one of information transmitted/received via the transceiver 1010 and information generated via the controller 1020. For example, the storage unit 1030 may store information/data/commands for performing operations according to FIGS. 2 to 7.

Figure 11:
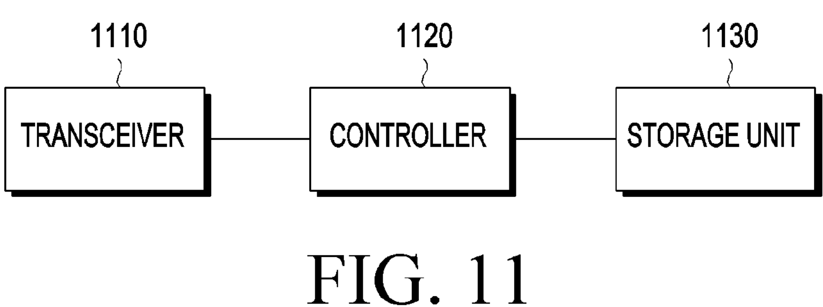
FIG. 11 is a view illustrating a structure of a network entity according to an embodiment of the disclosure.

FIG. 11 is a view illustrating a structure of a network entity according to an embodiment of the disclosure.

The network entity of FIG. 11 may be, e.g., one of the AMF, SMF, UPF, UDM, or AUSF entities of network A and/or network B of FIGS. 1 to 7.

Referring to FIG. 11, the network entity may include a transceiver 1110, a controller 1120, and a storage unit 1130. In the disclosure, the controller may be defined as a circuit or application-specific integrated circuit or at least one processor.

The transceiver 1110 may transmit and receive signals to/from other network entities. The transceiver 1110 may transmit/receive data and requests/responses to/from other network entities, for example.

The controller 1120 may control the overall operation of the base station according to an embodiment. For example, the controller 1120 may control inter-block signal flow to perform the operations according to FIGS. 2 to 7 described above. Specifically, the controller 1120 may control the operations proposed in the present invention to support UE mobility according to an embodiment of the present invention.

The storage unit 1130 may store at least one of information transmitted/received via the transceiver 1110 and information generated via the controller 1120. For example, the storage unit 1030 may store information/data/commands for performing operations according to FIGS. 2 to 7.

The embodiments herein are provided merely for better understanding of the present invention, and the present invention should not be limited thereto or thereby. In other words, it is apparent to one of ordinary skill in the art that various changes may be made thereto without departing from the scope of the disclosure. Further, the embodiments may be practiced in combination.

The invention claimed is:

1. A method by a first access and mobility management function (AMF) in a first network, the method comprising:
- receiving, from a user equipment (UE) through a base station, a registration request message, wherein the registration request message includes a temporary identifier (ID) of the UE and a network ID (NID) of a second network which is a standalone non-public network (SNPN);
- determining that the temporary ID is associated with the second network, and determining a second AMF based on the temporary ID and the NID;
- transmitting, to the second AMF, a request message for requesting context information of the UE; and
- receiving, from the second AME, a response message including the context information.

2. The method of claim 1, further comprising:
- transmitting, to the second AMF, a registration state update message including a protocol data unit (PDU) session ID to be released when mobility of the UE from the second network to the first network is mobility between SNPNs.

3. The method of claim 2, wherein the PDU session ID is obtained from the context information of the UE.

4. The method of claim 2, further comprising:
- deleting session management (SM) context information associated with the PDU session ID from the context information of the UE.

5. The method of claim 2, wherein the second AMF requests a first session management function (SMF) belonging to the second network to release session management (SM) context information associated with the PDU session ID.

6. The method of claim 1, wherein the temporary ID is a 5G-globally unique temporary identifier (GUTI).

7. The method of claim 1, wherein the second AMF is selected by a base station receiving the registration request message.

8. The method of claim 1, further comprising:
- transmitting, to the UE, a registration accept message including the UE's temporary ID information newly allocated by the first network.

9. A first access and mobility management function (AMF) entity in a first network, comprising:
- a transceiver; and
- at least one processor connected to the transceiver, wherein the at least one processor is configured to:
  - receive, from a user equipment (UE) through a base station, a registration request message, wherein the registration request message includes a temporary identifier (ID) of the UE and a network ID (NID) of a second network which is a standalone non-public network (SNPN),
  - determine that the temporary ID is associated with the second network, and determine a second AMF entity based on the temporary ID and the NID,
  - transmit, to the second AMF entity, a request message for requesting context information of the UE; and
  - receive, from the second AMF entity, a response message including the context information.

10. The first AMF entity of claim 9, wherein the at least one processor is further configured to:
- transmit, to the second AMF entity, a registration state update message including a protocol data unit (PDU) session ID to be released when mobility of the UE from the second network to the first network is mobility between SNPNs.

11. The first AMF entity of claim 10, wherein the PDU session ID is obtained from the context information of the UE.

12. The first AMF entity of claim 10, wherein the at least one processor is further configured to:
- delete session management (SM) context information associated with the PDU session ID from the context information of the UE.

13. The first AMF entity of claim 10, wherein the second AMF entity requests a first session management function (SMF) entity belonging to the second network to release session management (SM) context information associated with PDU session ID.

14. The first AMF entity of claim 9, wherein the temporary ID is a 5G-globally unique temporary identifier (GUTI).

15. The first AMF entity of claim 9, wherein the second AMF entity is selected by a base station receiving the registration request message.

16. The first AMF entity of claim 9, wherein the at least one processor is further configured to:
- transmit, to the UE, a registration accept message including the UE's temporary ID information newly allocated by the first network.

* * * * *